US011403880B2

(12) United States Patent
Kanga et al.

(10) Patent No.: US 11,403,880 B2
(45) Date of Patent: Aug. 2, 2022

(54) METHOD AND APPARATUS FOR FACILITATING IDENTIFICATION

(71) Applicant: WildFaces Technology Limited, Telegraph Bay (HK)

(72) Inventors: Rustom Adi Kanga, Gordon (AU); Lai Chun Li, Hong Kong (CN)

(73) Assignee: Wildfaces Technology Limited, Pok Fu Lam (HK)

( * ) Notice: Subject to any disclaimer, the term of this patent is extended or adjusted under 35 U.S.C. 154(b) by 0 days.

(21) Appl. No.: 17/253,243

(22) PCT Filed: May 10, 2019

(86) PCT No.: PCT/CN2019/086344
§ 371 (c)(1),
(2) Date: Dec. 17, 2020

(87) PCT Pub. No.: WO2020/001175
PCT Pub. Date: Jan. 2, 2020

(65) Prior Publication Data
US 2021/0271859 A1 Sep. 2, 2021

(30) Foreign Application Priority Data

Jun. 26, 2018 (HK) .................. 18108237.6

(51) Int. Cl.
*G06V 40/16* (2022.01)
*G06T 7/70* (2017.01)
(Continued)

(52) U.S. Cl.
CPC ......... *G06V 40/172* (2022.01); *G06K 9/6201* (2013.01); *G06K 9/629* (2013.01);
(Continued)

(58) Field of Classification Search
None
See application file for complete search history.

(56) References Cited

U.S. PATENT DOCUMENTS

| 2012/0243739 | A1* | 9/2012 | Fukuchi | G06V 20/20 |
| | | | | 382/103 |
| 2013/0194455 | A1* | 8/2013 | Bigioi | G06V 40/16 |
| | | | | 348/239 |

FOREIGN PATENT DOCUMENTS

| CN | 105488478 | | 4/2016 | |
| CN | 105488478 | A * | 4/2016 | ........... G06F 16/583 |

\* cited by examiner

*Primary Examiner* — Delomia L Gilliard
(74) *Attorney, Agent, or Firm* — Renner Kenner Greive Bobak Taylor & Weber

(57) ABSTRACT

The present invention relates to a method and apparatus for facilitating identification, particularly where images are of relatively low resolution and also where images may be taken by a moving imaging device, such as a mobile camera. In order to identify persons from images of persons, it is usually necessary to obtain a relatively high-resolution image from which face recognition data can be obtained. The face recognition data can be then matched against a database of many persons face recognition data obtained by an equivalent registration process.
Where the images are of relatively low resolution, however, it is difficult to obtain reliable matching.
The system and method described here, obtain a number of images of a person to be identified and consolidate data obtained from the images to increase the accuracy of identification. This system can identify persons even where relatively low resolution images and mobile cameras.

12 Claims, 5 Drawing Sheets

(51) Int. Cl.
*G06K 9/62* (2022.01)
*G06V 20/00* (2022.01)
*G06V 40/10* (2022.01)

(52) U.S. Cl.
CPC ................ *G06T 7/70* (2017.01); *G06V 20/00* (2022.01); *G06V 40/10* (2022.01); *G06T 2207/30196* (2013.01)

METHOD AND APPARATUS FOR FACILITATING IDENTIFICATION

FIELD OF THE INVENTION

The present invention relates to a method and apparatus for facilitating identification, and, particularly, but not exclusively, to a method and apparatus for facilitating identification of persons using face recognition from images that are of relatively low resolution and, particularly, but not exclusively to a method and apparatus for facilitating identification of persons using face recognition from images taken by a moving imaging device.

BACKGROUND OF THE INVENTION

Face recognition systems, which attempt to identify persons from images of persons obtained by imaging devices, are known. One approach to face recognition (FR) is to capture, via an imaging device, one or more images of a person's face. The image(s) are processed via various algorithms which compare data from the image against corresponding data from a gallery of images available for comparison, in a database, for example. The gallery of images are of known persons and if one image matches the captured image, then the person is identified.

This general approach to face recognition may be implemented in a number of ways, using many different available (and complex) algorithms and processes.

Face recognition is used in many applications, particularly (but not exclusively) relating to security. It may be important to identify persons present in areas such as airports, restricted entry premises and other facilities. Video cameras are often used to monitor such areas. Identification may also be important in public areas when incidents (e.g. crime) occur and images are available of persons involved in the incident (e.g. from video cameras mounted and monitoring the area or from public cameras, such as those on smart phones, for example).

To achieve FR from images that may have been obtained by imaging devices such as video cameras, a single image of a scene may be captured. Face detection (FD) is performed on the image to determine and extract a face and then this extraction image of the face is used to match against the gallery of available faces to perform FR. To achieve accurate face recognition, however, with current approaches, images of relatively high resolution are generally required.

There are many circumstances, however, where an image of the appropriate resolution for accurate identification is not available. These circumstances occur, for example, where an imaging device takes an image of a person from a distance. Or where the imaging device is not technically capable of obtaining sufficient resolution.

For accurate identification of persons using current face recognition systems, a resolution of between approximately 70 to 100 or more pixels between the eyes is required. Anything less than this and the accuracy of identification with current processes decreases and will generally not be possible below 40 pixels between the eyes. This is a problem for current face recognition systems.

One of the tasks that current face recognition systems are utilised for is to track the location of a person or persons across a geographical area. For example, public area cameras may be used to track people in a geographical location such as a city. Where only low resolution images are available, which may usually be the case with cameras in public areas, where the person being tracked may be far away from the camera, then identification and tracking of the person is difficult. The person is not able to be identified by comparison with galleries of images in databases, because the resolution is too low.

Further problems arise where the imaging devices are not fixed in location, but may be mobile imaging devices. For example bodyworn cameras, drones, personal smartphones, PTZ cameras or other moving live and forensic sources.

There are applications where it may be required to track location of persons between consecutive frames or a number of images obtained by an imaging device. Where a camera or other imaging device is fixed in location, it is possible to use location prediction to track persons between images taken by the device. This can be done by predicting where a "blob" or combination of pixels relating to a particular person captured in a first image is likely to be in a second image, which may be a consecutive frame taken by the imaging device. Because persons are only able to move a very short distance between two frames of a video, location prediction using fixed imaging devices can be very accurate. Where the device is a moving imaging device, however, tracking across frames becomes much more difficult, if not impossible. The trigonometry required to predict exactly where a person will show up in a subsequent frame of a moving device is complex and computing intensive. Further, when the imaging device is moving, it is quite likely that the person to be recognised will be further away and the image will be of relatively low resolution.

SUMMARY OF THE INVENTION

In accordance with a first aspect, the present invention provides a method of identifying a person from images obtained by an imaging device, comprising of the steps of:
 obtaining an image of a scene containing a person;
 processing the image to obtain recognition data associated with the person;
 obtaining a further image of the scene containing the person;
 processing the further image to obtain further recognition data, and
 processing the recognition data and further recognition data to obtain consolidated recognition data, whereby the consolidated recognition data may be utilised in a process for identifying the person.

In an embodiment, the step of processing the recognition data and further recognition data comprises the step of aggregating the recognition data. In an embodiment, recognition data may comprise data on facial features, such as the distance of the eyes, the width of the mouth, and further features. Data on the same features are obtained on each image and all the data from images and features are aggregated.

In an embodiment, the method comprises the further step of processing the consolidated recognition data to identify the person, by matching the consolidated recognition data against a database of consolidated recognition data for a plurality of persons, enrolled using an equivalent process. In an embodiment, the equivalent process is the same as discussed above described, where enrollment comprises capturing of an image and a further image of the person and consolidating the recognition data by aggregating the recognition data.

In an embodiment, the process comprises obtaining a number of images, between two and ten images, three to nine images, four to seven images, or may be five images, and obtaining recognition data from each of the obtained images for the person.

Consolidating the recognition data by aggregating the recognition data from the images, advantageously improves accuracy of the subsequent identification process.

The database of consolidated recognition data for persons may be enrolled using an equivalent process.

In an embodiment, the method is able to identify persons from relatively low resolution images. In an embodiment, identification can advantageously be obtained if there are between ten and one hundred pixels between the eyes, or between fifteen and eighty pixels, or eighteen and seventy pixels or between twenty and sixty pixels. In an embodiment, the process may identify persons with less than twenty five pixels all the way down to ten pixels with decreasing accuracy.

In order to obtain the plurality of images of the person (image, further image, etc.), in an embodiment it is necessary to track the location of the person across a plurality of images produced by the imaging device. For example, a person may be tracked from frame to frame, across a number of frames. Where an imaging device is fixed and directed onto a scene, this can be achieved with simple position tracking. There are a number of known methods of doing this tracking. Essentially, one captures some combination of pixels which represents the person (e.g. a blob of his shape, the colour of his clothes, the mix of pixels constituting his face etc.). The next step is to predict where the person will have moved to and then confirm this by looking for that combination of pixels in the new location. Because individuals are only likely to move a very short distance within the image between two frames of a video (which may be a very short time, such as $1/6^{th}$ of a second apart) tracking can be very accurate, making it simple to track a person across consecutive frames. A number of images (say 5) of the person is obtained and combining and aggregating the recognition data from these images, the process of this embodiment is able to construct a composite image and and enable relatively high identification accuracy even with low resolution images.

Although it is possible to predict the location of a person from one frame to another where the position of the imaging device is known e.g. where the camera is in fixed in position, tracking becomes much more difficult, if not impossible, if the camera is moving. For example, drones, bodyworn cameras, PTZ cameras, a camera on a moving smartphone or other moving live and forensic source. It may still be possible to perform face recognition in a conventional manner, if a high resolution image is obtainable. Often, however, particularly with these sources, it will be difficult to obtain a relatively high resolution image.

It is sometimes possible to achieve tracking from a mobile camera, but this is very difficult, and the trigonometry required to predict exactly where a person will show up in a subsequent image is extremely complex and computing intensive.

In an embodiment, the step of processing the further image comprises a step of distinguishing the person in the further image by utilising the recognition data associated with the first image and also recognition data obtained from the further image. The step of distinguishing the person in the further image, enables the location of the person in the further image to be established. In an embodiment, the step of distinguishing the person may be repeated for a number of images, so that the location of that person can be established for each of the number of images. A person can therefore be "tracked" from image to image. This tracking is carried out without using conventional location prediction. Instead, the person is identified in each image using the recognition data available just from the images. It is not necessary to match the persons data obtained from each image against a large database. It is only necessary to use the limited recognition data available in each image to determine the location of the person in the other image(s).

In an embodiment, where there are a plurality of people in the image, recognition data and further recognition data is obtained for each person, and the step of distinguishing comprises utilising the recognition data for each person to distinguish each person in the image from each other, so that each person can be identified and their location determined within a number of images.

In an embodiment, this approach for tracking person(s) through a plurality of images can be used with mobile imaging devices, such as mobile cameras. This is because tracking is being carried out by a limited identification process distinguishing the person in each image, not by conventional location prediction. Carrying out the limited recognition process (in an embodiment, face recognition) in order to distinguish the person from the limited potential number of other persons in the image, enables the person to be identified in each frame, and therefore consolidated data to be obtained from the plurality of images of the person. This consolidated data can then be used for the identification process as discussed above. In an embodiment, where there are a plurality of persons in the scene, each person can be distinguished from each other person in the image, and each person can separately be identified in an identification process.

In an embodiment, the recognition data comprises face recognition data. In an embodiment, the recognition data may also include other data associated with a person such as colour of clothing, their gait their body position and any other data about the person.

In accordance with a second aspect, the present invention provides an apparatus for identifying a person from images obtained by an imaging device, comprising a computing apparatus having a processor, a memory, and an operating system supporting computer processes, a data capture process arranged to process an image of a scene containing a person, to obtain recognition data associated with the person, the data capture process being arranged to process a further image and obtain further recognition data for the person, and a consolidation process arranged to process the recognition data and further recognition data to obtain consolidated recognition data, whereby the consolidated recognition data may be utilised in a process for identifying the person.

In an embodiment, the apparatus further comprises an identification process arranged to match the consolidated recognition data against a database containing equivalent consolidated recognition data for a plurality of persons, in order to identify the person.

In accordance with a third aspect, the present invention provides a computer program, comprising instructions for controlling a computer to implement a method in accordance with the first aspect of the invention.

In accordance with a fourth aspect, the present invention provides a non-volatile computer readable medium, providing a computer program in accordance with the third aspect of the invention.

In accordance with a fifth aspect, the present invention provides a data signal, comprising a computer program in accordance with the third aspect of the invention.

In accordance with a sixth aspect, the present invention provides a method for identifying a person from images obtained by an imaging device, comprising the steps of:
obtaining an image of a scene containing one or more persons;
processing the image to obtain recognition data associated with at least one of the persons;
obtaining a further image and processing the further image utilising the recognition data to distinguish the at least one person and obtain further recognition data for the person.

In an embodiment, the step of distinguishing the person comprises comparing the recognition data from the image and further image and determining a location for the person in the images. In an embodiment, this enables the location of the person to be tracked between images.

In an embodiment, the step of processing the image and further image comprises obtaining recognition data for a plurality of persons in the images, and matching the recognition data from each person to distinguish each person in the image. In an embodiment, this enables a plurality of the persons in the image to be tracked from image to image.

In embodiments, recognition data may be obtained for three or more images and a person(s) distinguished in each of those images and their location determined.

In this embodiment, it is not necessary to predict the location of the person from one image to another image in a conventional manner, using location prediction. Instead, the person is "tracked" by using the recognition data to distinguish that person from other persons that may be in the images. In embodiments, this approach will be suitable for images obtained by mobile video cameras, as no position prediction is required. Instead, carrying out a limited face recognition process (in embodiments where the recognition data is face recognition data) in order to distinguish the person from the limited potential number of other persons in the image, enables the person to be distinguished in each image.

In an embodiment, the method comprises the further step of processing the recognition data and further recognition data to provide consolidated recognition data. The consolidated recognition data may be used in a process for identifying the person. In an embodiment, this process maybe the process discussed above in relation to the first aspect of the invention. In an embodiment, where there are a plurality of persons in the image, each of the persons may be distinguished and identified.

This embodiment of the invention is not limited to use with images from mobile cameras, but could be used with any images, including images obtained from stationary video cameras. It is an advantage of an embodiment, however, that this process can be used with images from mobile cameras. In embodiments, images may be obtained from forensic sources, such as TV shows, on-line videos, and other sources and identification of persons may be carried out according to this process even where the imaging device taking the images was moving.

In an embodiment, the recognition data comprises face recognition metadata. In an embodiment, the recognition data may also include other data associated with a person, such as colour of clothing, their gait, their body position, and any other data.

In accordance with a seventh aspect, the present invention provides an apparatus for identifying a person from images obtained by an imaging device, comprising a computing apparatus having a processor, a memory, and an operating system supporting computer processes, a data capture process arranged to process an image of a scene containing one or more persons, to obtain recognition data associated with at least one of the persons, the data capture process being arranged to process a further image and obtain further recognition data for the person, and a matching process arranged to utilise the recognition data to distinguish the person in the images.

In an embodiment, the data capture process is arranged to obtain recognition data for a plurality of persons in the image, and the matching process is arranged to match the recognition data from each person to distinguish the person in the images.

In an embodiment, the apparatus further comprises a consolidation process, which is arranged to process the recognition data and the further recognition data to provide consolidated recognition data which may be used in a process for identifying the person.

In accordance with an eighth aspect, the present invention provides a computer program, comprising instructions for controlling a computer to implement a method in accordance with the sixth aspect of the invention.

In accordance with a ninth aspect, the present invention provides a non-volatile computer readable medium, providing a computer program in accordance with the third aspect of the invention.

In accordance with a tenth aspect, the present invention provides a data signal, comprising a computer program in accordance with the eighth aspect of the invention.

Embodiments of the invention are not limited to identifying persons, but may, in some embodiments, be used to identify other items, such as objects, animals, or any other item.

In accordance with an eleventh aspect, the present invention provides a method of identifying an item from images obtained by an imaging device, comprising the steps of:
obtaining an image of a scene containing one or more items;
processing the image to obtain recognition data associated with at least one of the items, obtaining further images and processing the further images utilising the recognition data to distinguish the at least one item and obtain further recognition data for the item.

In accordance with a twelfth aspect, the present invention provides an apparatus for identifying items from images obtained by an imaging device, comprising a computing apparatus having a processor, a memory, and an operating system supporting computer processes, a data capture process arranged to process an image of a scene containing one or more items, to obtain recognition data associated with at least one item, the data capture process being arranged to process a further image and obtain further recognition data for the item, and a matching process arranged to utilise the recognition data to distinguish the item in the images.

In an embodiment, the apparatus further comprises a consolidation process arranged to consolidate the recognition data and further recognition data to obtain consolidated data for the item.

In accordance with a thirteenth aspect, the present invention provides a computer program, comprising instructions for controlling a computer to implement a method in accordance with the eleventh aspect of the invention.

In accordance with a fourteenth aspect, the present invention provides a non-volatile computer readable medium, providing a computer program in accordance with the thirteenth aspect of the invention.

In accordance with a fifteenth aspect, the present invention provides a data signal, comprising a computer program in accordance with the thirteenth aspect of the invention.

In accordance with a sixteenth aspect, the present invention provides a method of identifying an item from images obtained by an imaging device, comprising the steps of:
- obtaining an image of a scene containing an item;
- processing the image to obtain recognition data associated with the items;
- obtaining a further image of the scene containing the item;
- processing the further image to obtain further recognition data, and
- processing the recognition data and further recognition data to obtain consolidated recognition data, whereby the consolidated recognition data may be utilised in a process for identifying the item.

In accordance with a seventeenth aspect, the present invention provides an apparatus for identifying an item from images obtained by an imaging device, comprising a computing apparatus having a processor, a memory and an operating system supporting computer processes, a data capture process arranged to process an image of the scene containing an item, to obtain recognition data associated with the item, the data capture process being arranged to process a further image and obtain further recognition data for the item, and a consolidation process arranged to process the recognition data and further recognition data to obtain consolidated recognition data, whereby the consolidated recognition data may be utilised in a process for identifying the item.

In accordance with an eighteenth aspect, the present invention provides a computer program, comprising instructions for controlling a computer to implement a method in accordance with the sixteenth aspect of the invention.

In accordance with a nineteenth aspect, the present invention provides a non-volatile computer readable medium, providing a computer program in accordance with the eighteenth aspect of the invention.

In accordance with a twentieth aspect, the present invention provides a data signal, comprising a computer program in accordance with the eighteenth aspect of the invention.

BRIEF DESCRIPTION OF DRAWINGS

Features and advantages of the present invention will become apparent from the following description of embodiments thereof, by way of example only, with reference to the accompanying drawings, in which.

DETAILED DESCRIPTION OF EMBODIMENTS

Figure 1:
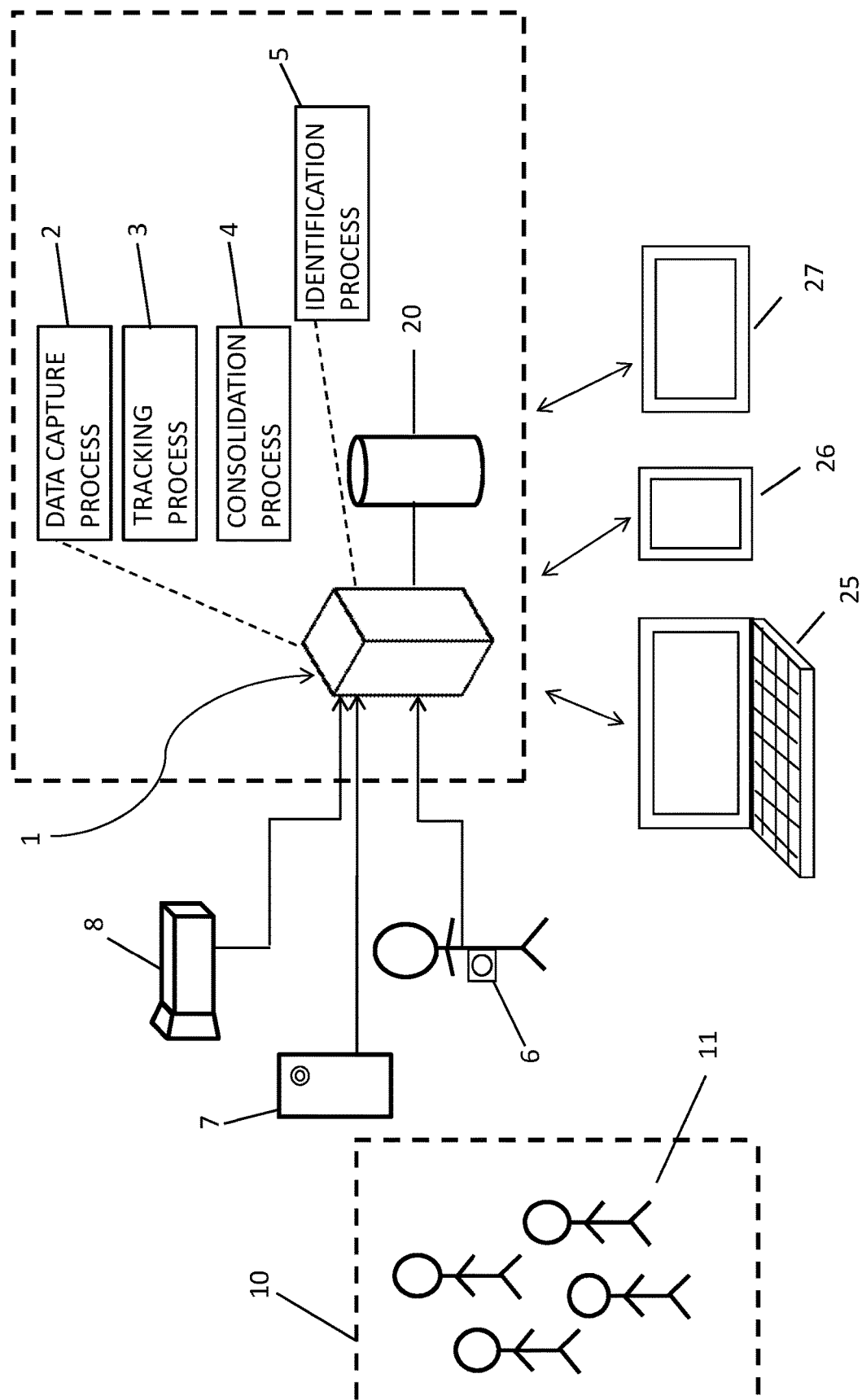
FIG. 1 is a schematic block diagram illustrating an apparatus in accordance with an embodiment of the present invention.

FIG. 1 illustrates an apparatus in accordance with an embodiment of the present invention, referenced by reference numeral 1. In this embodiment, the apparatus 1 is illustrated as a server computer 1. It may comprise a number of server computers, however, or any other type of computer apparatus, or may comprise a computer system implemented in the "Cloud".

The computer apparatus 1 comprises a processor, memory and operating system (not shown) implementing a plurality of computer processes 2, 3, 4, 5.

In this embodiment, the computer apparatus 1 is arranged to obtain appropriate data and carry out a face recognition (FR) process, from images that have relatively low resolution, such that a single image does not necessarily provide enough information to enable accurate FR.

In this embodiment, the apparatus 1 is arranged to process an image obtained by one or more imaging devices (reference numerals 6, 7 and 8 in FIG. 1) of a scene 10 containing persons 11.

The image is processed by the apparatus 1 to obtain recognition data associated with at least one of the persons 11. A further image is processed utilised the recognition data to distinguish the at least one person from the other persons and obtain further recognition data for the person. The apparatus 1 is then arranged to process the recognition data and further recognition data to provide consolidated recognition data which may be used in a face recognition (FR) process.

A database 20 may store galleries of images to enable the FR process. The database may be implemented by the apparatus 1 memory or may be a separate database or may be a remote database.

The apparatus 1 includes communications interfaces (not shown) to communicate with imaging devices 6, 7, 8, and database 20 (if remote) and also responder devices 25, 26, 27.

The responder devices 25, 26, 27 may be operated by person(s) who wish to obtain the identification of the persons image. For example, responders may include security personnel monitoring locations or incidents that require responses.

Figure 2:
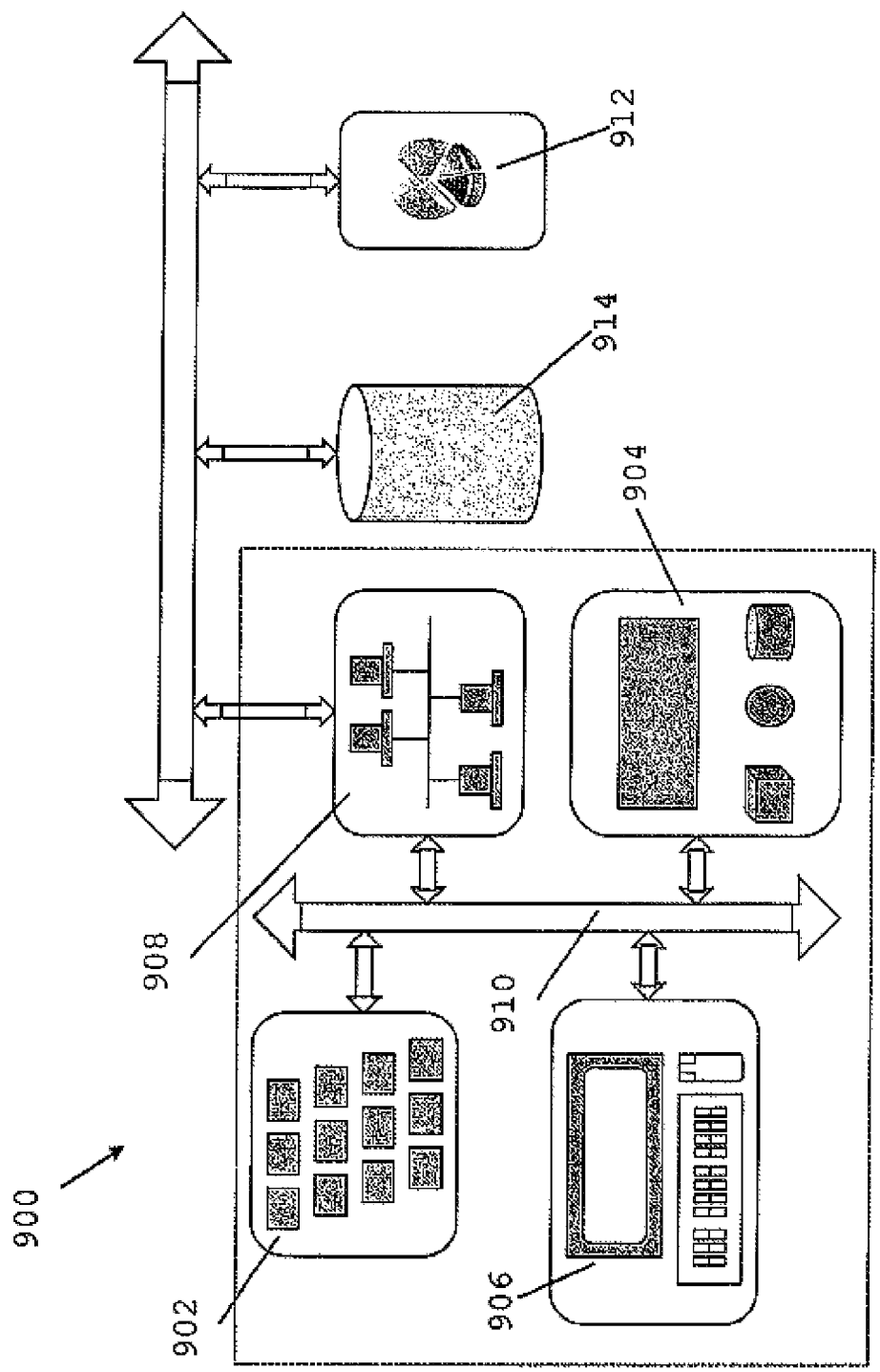
FIG. 2 is a schematic diagram of a computing apparatus which may be utilised to implement an apparatus in accordance with an embodiment of the present invention.

FIG. 2 is a schematic block diagram of an example computing arrangement which may be utilised for implementation of the apparatus 1.

The computer 900 may comprise a server computer, personal computer, portable computer, or any other type of computing device. The computer 900 may also comprise an embedded system incorporated within the imaging device 6, 7, 8. In such an alternative, the apparatus 1 would be all or mainly incorporated in the imaging device 6, 7, 8. For broad, surveillance applications, for example, however, the apparatus 1 is likely to be a separate computing apparatus, such as a server, as illustrated in FIG. 1.

The computer 900 comprises a suitable operating system and appropriate computer processes for implementation of the identification apparatus 1 of this embodiment of the invention.

The computer 900 comprises one or more data processing units (CPUs) 902; memory 904, which may include volatile or non-volatile memory, such as various types of RAM memories, magnetic discs, optical disks and solid state memories; a user interface 906, which may comprise a monitor, key board, mouse and/or touch-screen display; a network or other communication interface 908 for communicating with other computers as well as other devices; and one or more communication busses 910 for interconnecting the different parts of the system 900.

The computer 900 may also access data stored in a database 914 via communications interface 908. Database 914 may be a distributed database. The database is shown as 20 in FIG. 1.

A part or all of the computer apparatus may be implemented in the "Cloud".

This embodiment of the present invention is implemented by appropriate computer processes in the form of software providing instructions for operation of the computing apparatus hardware to implement the apparatus of the embodiment and the method of the embodiment. The computer processes facilitating embodiments of the present invention may be implemented as separate modules, which may share common foundations such as routines and sub-routines. The computer processes may be implemented in any suitable way, and are not limited to the separate modules. Any software/hardware architecture that implements the functionality may be utilised.

A computer system for implementing embodiments of the invention is not limited to the computer system described in the preceding paragraphs. Any computer system architecture may be utilised, such as standalone computers, networked computers, dedicated computing devices, hand held devices or any device capable of receiving and processing in accordance with embodiments of the present invention. The architecture may comprise client/server architecture, or any other architecture. The software for implementing embodiments of the invention may be processed by "Cloud" computing architecture. In embodiments, the various processes implemented may be distributed across a number of processors. For example, some may be performed near the imaging device (at the "Edge") and some at a central server.

Referring again to FIG. 1, this embodiment of the invention implements a process which facilitates identification of persons via face recognition (FR), even where the images obtained may be of relatively low resolution, such that a single image does not necessarily provide enough information to enable accurate FR.

Figure 3:
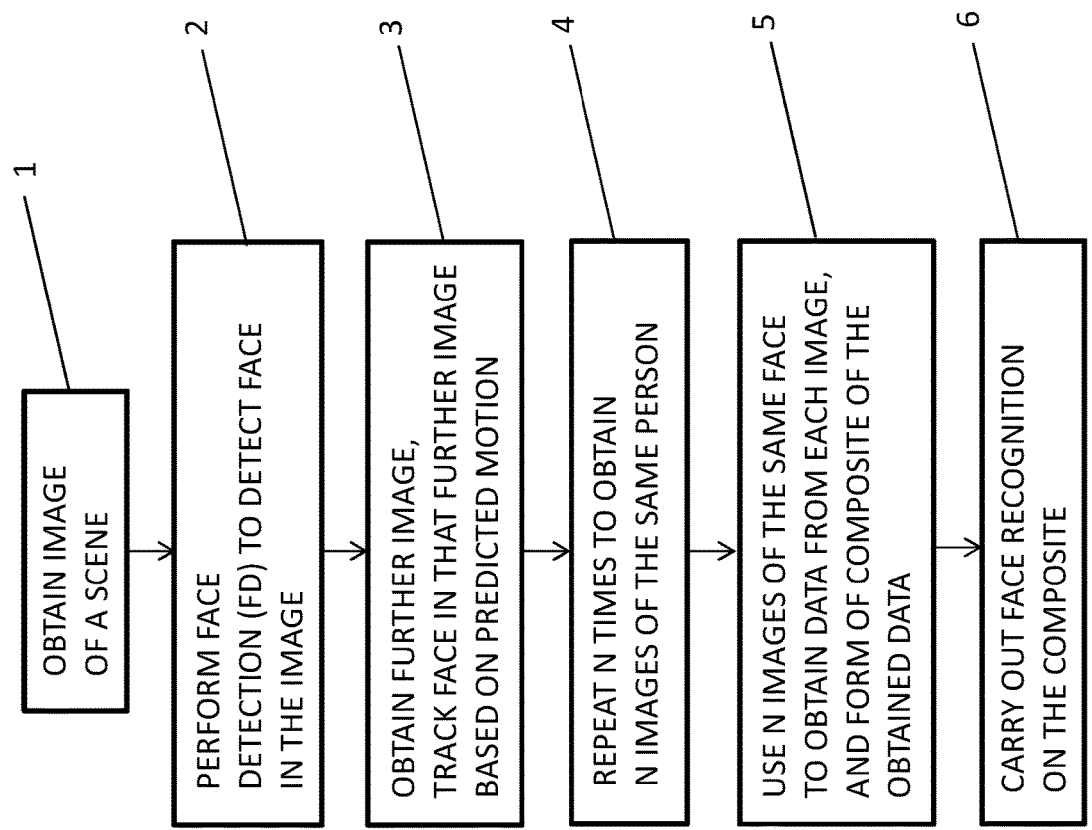
FIG. 3 is a flow diagram illustrating a process in accordance with an embodiment of the present invention.

In the process of this embodiment, a target person is "tracked" to obtain a number of images of the person's face. Recognition data obtained from the number of images is consolidated, and FR is carried out using the consolidated data. This process will now be described in more detail with reference to FIG. 3.

At Step 1, an image of a scene is obtained from an imaging device, 6, 7, 8. At Step 2, a face detection (FD) process is carried out on the obtained image to detect any faces in the image.

At Step 3, a further image is obtained, which will usually be the next frame in the video sequence. The person whose face was detected in the first image, is located in the second image. Location may be done by conventional means, such as predictive motion prediction, utilised in this embodiment, and described above. Using predictive motion is known, but as discussed above is particularly suited to stationary cameras. A further embodiment of this invention uses a different technique to track the position of a person in the video sequence, and this further embodiment will be described below. In this embodiment, however, any means for predicting motion of a person from one image to another in a video sequence can be utilised.

This process is repeated "n" times to obtain n images of the face of the same person (Step 4), by the tracking process 3 (FIG. 1).

At Step 5, using the n images of the same face, recognition data is obtained for each face from each image (the data capture process 2) and a composite of the data is created by the consolidation process 4.

The composite data can be used to carry out FR by the identification process 5, with higher accuracy than data obtained from just a single image (Step 6).

The identification process of Step 6 can be carried out in any way, but will usually be by comparison of the composite data obtained from the plurality of images, with similar, composite data for many persons stored in a database. The data for the many persons will be enrolled utilising a similar process to the above to obtain the composite data for each person in the database.

The process of consolidating the data will now be described in more detail.

Where a relatively high resolution image of a person's face has been obtained, a technique for carrying out face recognition is as follows:

For each face one can extract a number of features. Such features could take variety of forms such as the distance between the eyes, the width of the mouth, etc. Normally these features are aggregated using a weighted average where some features have a higher importance and hence value than others to create a single feature attribute that represents the person. Traditionally this single aggregated feature attribute is matched against the same aggregated feature attribute of the target person's image from the live or forensic video Single Aggregate Feature SAF=Sum of $(x*a)_{1,y}$ Where x is the particular feature and a is the weighting factor and y are the number of features extracted.

If there are insufficient features available, which can happen when one has a low resolution image, the most important features are collected but without sufficient features the accuracy would be low, and it will likely not be possible to identify the person.

In accordance with this embodiment of the invention, however, multiple images of the person are obtained, as discussed above. Each of these images will provide a slightly different image of the persons face. In this embodiment, the parameters of the multiple images are merged to create a composite, aggregated image of the person's face, which can be considered to be a 3D image of the person.

One can use such a technique to enroll persons in a database as well as for matching. By having a 3D image of the person one compensates for the lack of information available in a single low resolution image and a much higher accuracy can be achieved than with a single low resolution image.

So in this case the

3D Aggregated Feature 3DAF=Sum of $(x(1)*a(1)+x(2)*a(2)+ \ldots X(n)*a(n)))_{1,z/n}$ Where x is the particular feature and a is the weighting factor and z are the number of features extracted. N are the number of images used to create the 3D image.

In the past, where the multiple images have been used, let us say 3 images are used, then three separate SAF are calculated SAF (1), SAF (2) and SAF (3) and Single Aggregate Features of the target (SAF (T)) are matched against each of one of the three separate SAFs separately and if SAF(T) is sufficiently close to either one of SAF (1), SAF (2), OR SAF (3) then there is considered to be a match.

In the approach of this embodiment of the present invention, the n sets of features are merged as above to create a single 3D Aggregated Feature which represents the average aggregate of the features of the person.

Now, when the 3DAF of the target are matched against that in the enrolled database one can achieve a much higher accuracy of a match.

In this embodiment, conventional means can be used to track the person from one video frame to the next. In this example, conventional position prediction is used, by following the pixels representing the person one from one frame to the next. As discussed above, while this tracking technique is suitable for use with cameras which are fixed in position (e.g. camera 8) it presents much more difficulty to use this technique with cameras that may be mobile (e.g. 6 and 7).

A further embodiment of the invention, which utilises a novel tracking technique, will now be described with reference to FIGS. 4 and 5.

Figure 4:
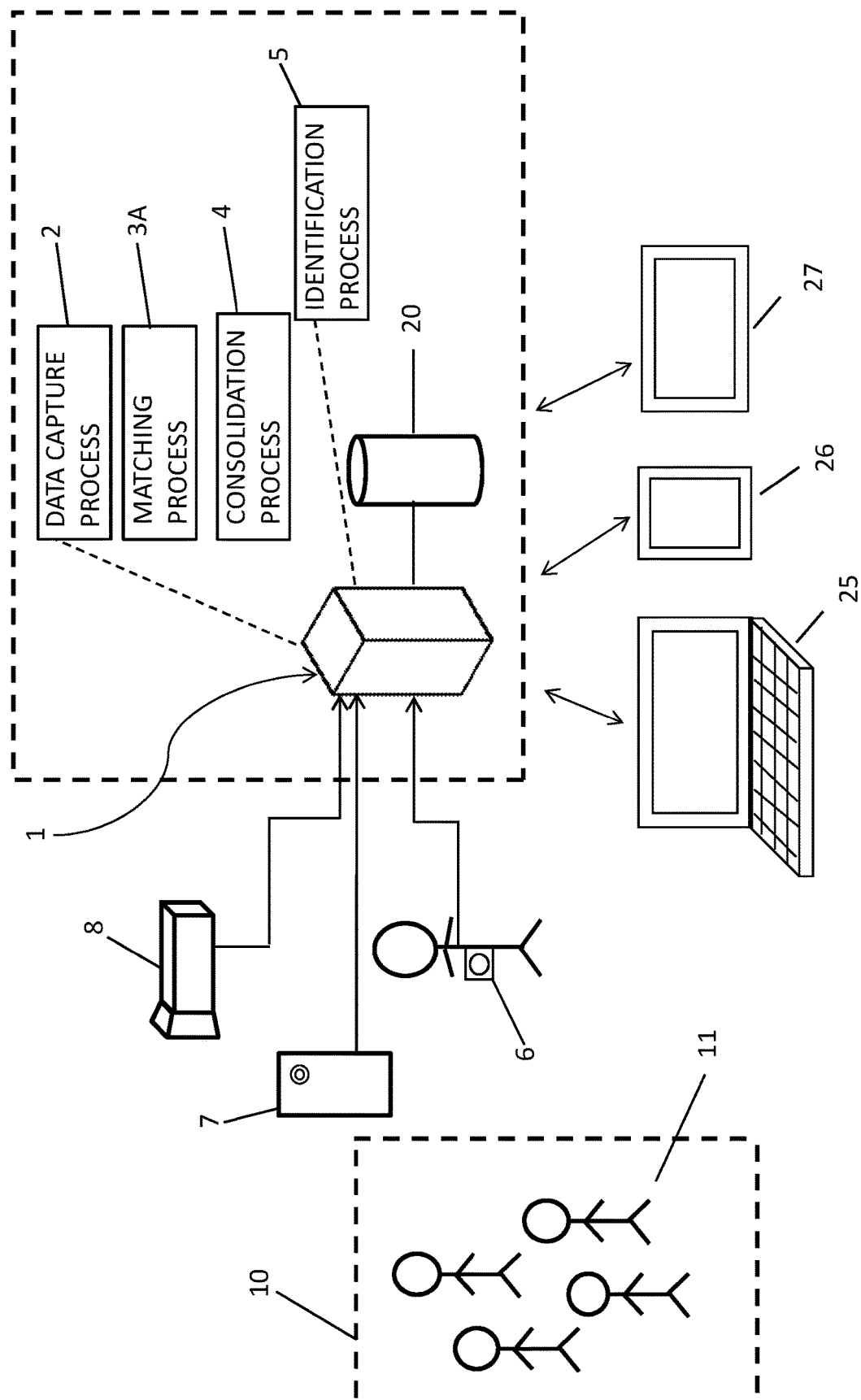
FIG. 4 is a schematic diagram of a computing apparatus which may be utilised to implement an apparatus in accordance with a further embodiment of the present invention.
Figure 5:
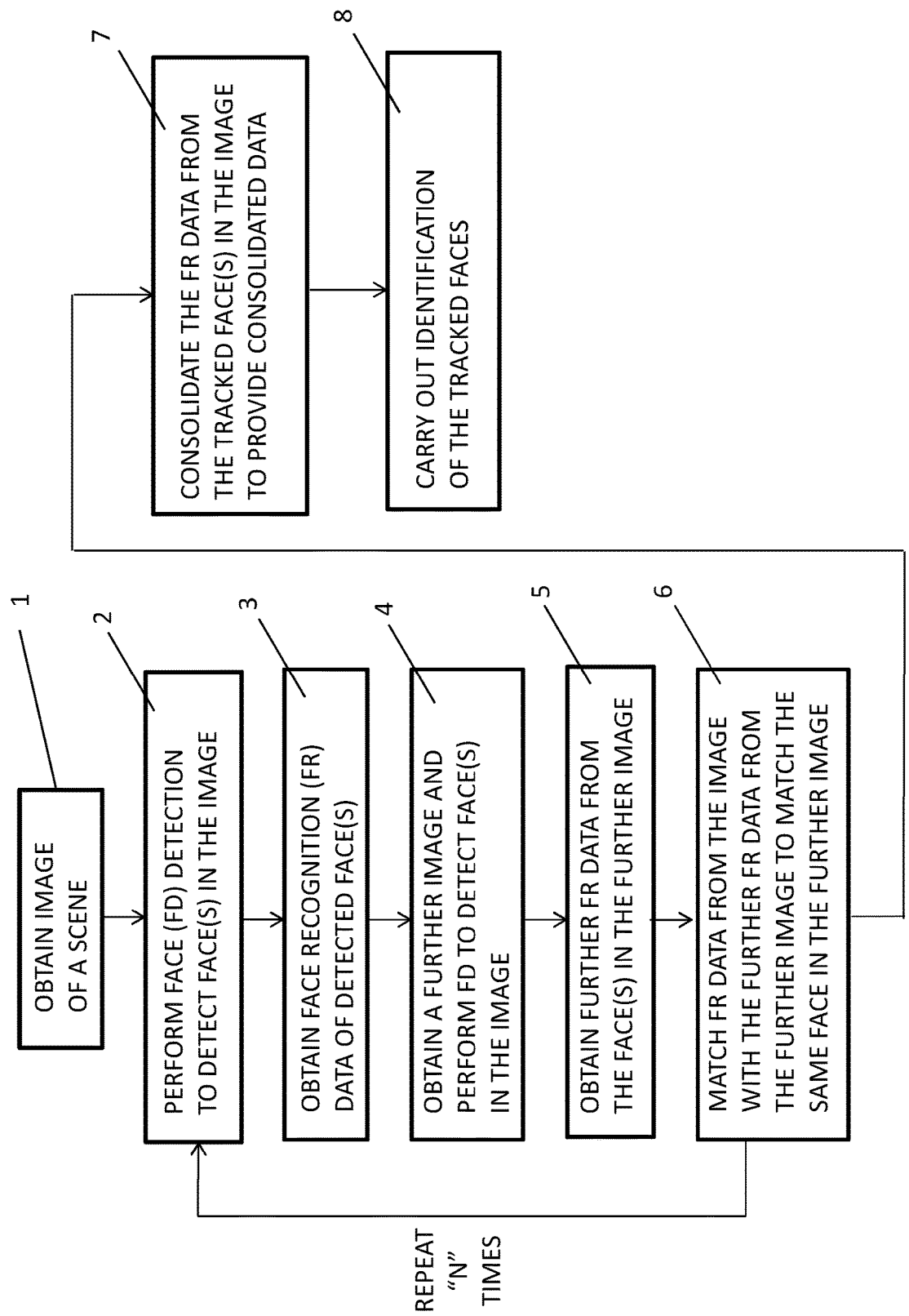
FIG. 5 is a flow diagram illustrating a process in accordance with a further embodiment of the present invention.

In FIG. 4, the same reference numerals are used as in FIG. 1 to denote similar components. Further detailed description of these components will not be given. To track images of persons across images obtained by the imaging devices 6, 7, 8, however, a matching process 3A is implemented by apparatus 1, in place of the conventional tracking process 3 of FIG. 1.

In more detail:

The cameras 6, 7, 8 (or any other camera or imaging device) may be used to capture images of persons 11 in a scene 10. The scene 10 may not be a fixed location but may be movable itself. For example, wearable camera 6 or smartphone camera 7 may be used to capture any incident or image of a person at any location. The scene 10 may therefore move, and the people 11 may move through the scene. Mobile cameras 6, 7 are also moveable.

Cameras 6, 7 and 8 are arranged to capture video of persons 11 in the scene 10. Video frames are transmitted to processing apparatus 1 so that images of the scene are obtained by the processing apparatus (Step 1, FIG. 4). The data capture process 2 of the processing apparatus 1 is arranged to process the obtained image to detect faces in the image (Step 2) and to obtain recognition data, (in the form of face recognition data in this embodiment (FR)) of detected faces (Step 3).

The data capture process is then arranged to process a further image, perform face detection to detect faces in the further image (Step 4) and obtain FR data from the faces in the further image (Step 5). A matching process 3 then does essentially an "internal" face match using the FR data obtained in Steps 4 and 5 to distinguish between the persons 11 in the images (Step 6). This essentially operates to identify the same persons between image frames. Because there are only ever likely to be a few people in the images, the metadata obtained for by FR can easily distinguish between the persons in the image, without requiring a full identification of the person against a large gallery of images. The matching process only needs to distinguish between the very few people in the captured images.

Meta data from the image and further image can thus be associated with one of the persons. The process of obtaining further images, performing face detection and face recognition to obtain further data for the person can be repeated a number of times ("n" times). Metadata for face recognition can therefore be obtained from a number of image frames and associated with one person, because the image data for that person has been distinguished by the matching process 3. The consolidation process 4 then consolidates all the FR data obtained via the process from the images. This effectively "tracks" the person through the captured image frames, without requiring any location prediction for the location of the person between frames.

Once consolidation of the FR data has taken place (Step 7), identification of the tracked face or faces can then be carried out by the identification process (Step 8) of the first embodiment, described above. The identification can be carried out using the consolidated data against a much larger database of a gallery of images containing comparable data.

The person or persons being identified do not even need to be in all images. It will be sufficient that they are in "n" images. They may move in and out of the scene, for example, particularly where a mobile imaging device is involved.

Note that the metadata acquired from the face recognition from a single low resolution image may have too much or too little information. This depends on how crowded with people the scene may be. For instance, if there are only a couple of people in the scene, it may be appropriate to use fewer and simpler parameters for the "tracking" distinguishing recognition. This may mean using fewer parameters for the whole face or use more parameters but only on a limited part of the face, e.g. the upper half to the eyes. Processing requirements can therefore be varied. We require sufficient parameters to differentiate the people in the scene but not sufficient to do a full identification. We only need sufficient so that we can track persons from image to image.

If there are many persons in the scene, additional parameters beyond those required for FR tracking could be used. These could include facial parameters that identify gender or age or ethnicity or any other non-facial parameters, such as colour of clothes or hair, or height of the person. It could also include "behavioural" parameters, such as a person's gait or the fact that the person is sitting or fallen down, or inside a vehicle, or their distance from a marker, such as a tree. Referring again to FIG. 4, in Steps 4, 5 and 6, as well as a face recognition data, other recognition data could be obtained.

It is possible, as discussed above, that the same person's face may not be seen in all images. Using this method, however, it is possible to identify a person who may appear in some but not all the images, and pull out enough data from, say 5 out of 10 consecutive images (any number could be used). This may still be sufficient to consolidate metadata and hence identify the person.

Note that for the matching process, different weighting may be accorded to different data. For example, where further data, other than the face recognition data is used, the further data could be used "e.g. colour of clothes" as a secondary confirmation. Alternatively, face recognition data could be rated lower than the other data.

Note that, in the above embodiment, the tracking process via the matching process could be utilised to track a person across different scenes, without it necessarily being required to identify the person by comparing with a large database of the persons enrolled in the same way. One surveillance camera may detect that a person is acting suspiciously, for example, and obtain recognition data relating to that person. A matching process can then be used with images received from other cameras in other areas, to determine if that person (even though we don't know his absolute identity) appears in those cameras. We can therefore track the suspicious person across a geographical area. Face matching identification with a large database can be done later, if required.

In the above embodiment, the process and apparatus are applied to face recognition of people. The invention is not limited to this. In other embodiments, items such as objects in the scene could be distinguished from each other and recognised. For example, different vehicles could be distinguished and recognised based on their body shape, or other parameters. Other items could be distinguished.

In the above embodiment, the invention is applied most usefully to mobile imaging devices. The invention is not limited to this application, however. It may also be used with stationary cameras, for example.

In the above embodiment, where a device is mobile, such as a smartphone or wearable camera or other mobile device, the location data for the device may also be obtained, so that it can be determined what geographical location the device is at when it is taking a picture of the scene, and therefore where the scene is.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of identifying a person from a video sequence obtained by an imaging device comprising the steps of:
    (a) obtaining an image of a scene from the video sequence containing a person;
    (b) processing the image to obtain recognition data associated with the person;
    (c) obtaining a further image of the scene containing the person, the further image being a next frame in the video sequence;
    (d) processing the further image to obtain further recognition data,
    (e) processing the recognition data and further recognition data to obtain consolidated recognition data, whereby the consolidated recognition data may be utilised in a process for identifying the person, wherein each of the recognition data contains a single aggregate feature of the person; and wherein step (e) comprises the steps of:
        merging the aggregate features to create a composite aggregated feature representing an average aggregate of features of the person; and
        matching the composite aggregated feature against an enrolled database for identifying the person using an equivalent process.

2. The method in accordance with claim 1, wherein the step of processing the further image comprises a step of distinguishing the person in the further image by utilising recognition data associated with the first image and also recognition data obtained from the further image.

3. The method in accordance with claim 2, comprising the step of determining the location of the person in the further image.

4. The method in accordance with claim 3, wherein the step of distinguishing the person is repeated for a number of images and the location of that person is established for each of the number of images, and recognition data for the person is obtained from the number of images.

5. The method in accordance with claim 2, wherein there are plurality of people in the image(s), recognition data and further recognition data is obtained for each person, and the step of distinguishing comprises utilising the recognition data for each person to distinguish each person in the image from each other, whereby each person can be identified and their location determined within a number of images.

6. An apparatus for identifying a person from a video sequence obtained by an imaging device, comprising a computing apparatus having a processor, a memory, and an operating system supporting computer processes, a data capture process arranged to process an image of a scene from the video sequence containing a person, to obtain recognition data associated with the person, the data capture process being arranged to process a further image and obtain further recognition data for the person, the further image being a next frame in the video sequence, and a consolidation process arranged to process the recognition data and further recognition data to obtain consolidated recognition data, wherein each of the recognition data contains a single aggregate feature of a face of the person, the consolidation process is further arranged to merge the aggregate features to create a composite aggregated feature representing an average aggregate of features of the face of the person, and to match the composite aggregated feature against a database containing equivalent consolidated recognition data for a plurality of persons in order to identify the person.

7. A method for identifying a person from a video sequence obtained by an imaging device, comprising the steps of:
    (a) obtaining an image of a scene from the video sequence containing one or more persons;
    (b) processing the image to obtain recognition data associated with at least one of the persons;
    (c) obtaining a further image and processing the further image utilising the recognition data to distinguish the at least one of the person and obtain further recognition data for the at least one person, the further image being a next frame in the video sequence; and
    (d) processing the recognition data and further recognition data to obtain consolidated recognition data, whereby the consolidated recognition data is utilised in a process for identifying the at least one person, wherein each of the recognition data contains a single aggregate feature of the at least one person, and wherein step (d) comprises the steps of:
        merging the aggregate features to create a composite aggregated feature representing an average aggregate of features of the at least one person; and
        matching the composite aggregated feature against an enrolled database for identifying the at least one person using an equivalent process.

8. The method in accordance with claim 7, wherein the step of distinguishing the person comprises comparing the recognition data from the image and further image and determining a location for the person in the images.

9. The method in accordance with claim 7, wherein the step of processing the image and further image comprises obtaining recognition data for a plurality of persons in the images, and matching the recognition data from each person to distinguish the person in the image.

10. The method in accordance with claim 9, wherein the step of processing the image and further image comprises obtaining further recognition data for the plurality of persons, and processing the recognition data and further recognition data to provide consolidated recognition data for each person.

11. The method in accordance with claim 7, wherein the recognition data comprises face recognition data.

12. The method in accordance with claim 11, wherein the recognition data further comprises other data associated with the image of the person, not being facial recognition data.

* * * * *